US011846521B2

(12) United States Patent
Vos et al.

(10) Patent No.: US 11,846,521 B2
(45) Date of Patent: Dec. 19, 2023

(54) NAVIGATION SYSTEM AND METHOD (71) Applicant: ELITAC B.V., Utrecht (NL)

(72) Inventors: Wouter Karel Vos, Utrecht (NL); Guus De Hoog, Utrecht (NL)

(73) Assignee: ELITAC B.V., Utrecht (NL)

( * ) Notice: Subject to any disclaimer, the term of this patent is extended or adjusted under 35 U.S.C. 154(b) by 0 days.

(21) Appl. No.: 17/775,613

(22) PCT Filed: Nov. 12, 2020

(86) PCT No.: PCT/NL2020/050714
§ 371 (c)(1),
(2) Date: May 10, 2022

(87) PCT Pub. No.: WO2021/101372
PCT Pub. Date: May 27, 2021

(65) Prior Publication Data
US 2022/0390253 A1    Dec. 8, 2022

(30) Foreign Application Priority Data

Nov. 18, 2019  (NL) ...................................... 2024255

(51) Int. Cl.
*G01C 21/36* (2006.01)
*G01C 17/02* (2006.01)
*G01C 17/38* (2006.01)

(52) U.S. Cl.
CPC ......... *G01C 21/3652* (2013.01); *G01C 17/02* (2013.01); *G01C 17/38* (2013.01)

(58) Field of Classification Search
CPC .... G01C 21/3652; G01C 17/02; G01C 17/38; G01C 21/20
See application file for complete search history.

(56) References Cited

U.S. PATENT DOCUMENTS

2013/0218456 A1* 8/2013 Zelek ................. G01C 21/3652
701/411

\* cited by examiner

*Primary Examiner* — Khoi H Tran
*Assistant Examiner* — Rodney P King
(74) *Attorney, Agent, or Firm* — Jordan IP Law, LLC; Todd A. Vaughn (57) ABSTRACT

A navigation system for aiding a human navigating, the navigation system includes a belt having a belt length and opposite belt ends, and includes an elongated compartment; a belt coupling arranged to the belt for coupling the belt ends; a compass sensor arranged to the belt and for sensing the compass direction based on the earth's magnetic field; a tactile unit arranged for tactile communicating a direction to the human; additional tactile actuators arranged to the belt and for communicating a direction to the human. The additional tactile actuators are distributed over the length of the belt. An elongated mesh is provided for arranging the elongated mesh inside the elongated compartment, the additional tactile actuators being arranged to the mesh. A processing unit is configured for controlling the navigation system.

17 Claims, 3 Drawing Sheets

NAVIGATION SYSTEM AND METHOD

CROSS REFERENCE TO RELATED APPLICATIONS

The present application is a National Stage Application of PCT International Application No. PCT/NL2020/050714 (filed on Nov. 12, 2020), under 35 U.S.C. § 371, which claims priority to Dutch Patent Application No. NL 2024255 (filed on Nov. 18, 2019), which are each hereby incorporated by reference in their respective entireties.

FIELD OF THE INVENTION

The invention relates to the field of navigation systems and methods for navigating, more particular to the field of tactile navigation systems and methods for navigating.

BACKGROUND OF THE INVENTION

Navigating from one point to the other is common in everyday practise. People may navigate based on signs or features in the landscape. While hiking, common tools for navigating are a map and compass.

A more advanced tool for hiking is GPS navigation. GPS navigation can be done with a separate device: a GPS navigator, or even on one's smartphone as app. A GPS navigator typically lets you set a couple of waypoints. When hiking in the field, the device tracks your movement and detects when you have reached the waypoint. When a waypoint is reached, the GPS navigator typically automatically switches to the next waypoint.

A disadvantage is that the GPS navigator should be held in your hand when checking your position. This means that you will either hike for longer times without checking if you are going in the right direction or you are constantly hiking with the GPS navigator in your hand. This disadvantage becomes even more prominent when hiking in difficult terrain, forcing the hiker to stand still while checking its position with the GPS navigator and thus loosing time. A further disadvantage may be that the display of a GPS navigator emits light, which especially hinders the user during night conditions as the eyes of the user have to adapt to night conditions after every time the user looked at the display, making e.g., hiking even more dangerous.

SUMMARY OF THE INVENTION

An object of the invention is to mitigate the disadvantages as mentioned above.

According to a first aspect of the invention, a navigation system for aiding a human navigating, comprising:
- a belt having a belt length and opposite belt ends, and comprising an elongated compartment;
- a belt coupling arranged to the belt for coupling the belt ends;
- a compass sensor arranged to the belt and for sensing the compass direction based on the earth's magnetic field;
- a tactile unit arranged for tactile communicating a direction to the human;
- additional tactile actuators arranged to the belt and for communicating a direction to the human, wherein the additional tactile actuators are distributed over the length of the belt;
- an elongated mesh having a size configured for arranging the elongated mesh inside the elongated compartment, wherein the additional tactile actuators are arranged to the mesh; and
- a processing unit configured for the steps of:
  - receiving the compass direction from the compass sensor;
  - retrieving a waypoint defining the point where to the human is navigating;
  - retrieving a current position of the human;
  - determining a bearing based on the waypoint and the current position;
  - determining an alignment based on the bearing and the compass direction;
  - associating one of the additional tactile actuators with a deviation from the alignment;
  - activating one of the additional tactile actuators based on the deviation from the alignment; and
  - activating the tactile unit based on the alignment;
  - wherein the tactile unit is arranged to the belt coupling,
  - wherein the belt comprises a nonelastic material for providing the belt in a longitudinal direction with an invariable length, and
  - wherein the additional tactile actuators are arranged inside the elongated compartment.

The navigation system comprises a belt. Typically, the belt is an elongated shaped object that can be folded, placed or worn around the waist of the human that wants to navigate. The belt provides a stable frame or stable platform for arranging the other element of the navigation system to. The belt has two ends, which meet each other when folded around the waist of the human navigating.

The belt coupling couples the two ends of the belt when folded around the waist of the human navigating. The belt coupling typically comprises two parts, wherein each part is arranged to an end of the belt. The two parts are arranged for cooperating to form a releasable coupling.

The compass sensor is typically a magnetic sensor for sensing the earth's magnetic field. The compass sensor typically senses the earth magnetic field direction relative to the orientation of the compass sensor. The compass direction is thus relative to the orientation of the compass sensor.

The tactile unit communicates a direction to the human navigating. The tactile unit uses tactile sense or tactile sensory of the human navigating. This provides the technical effect of using another sense of the human than e.g. the visual sense. The advantage is that the human may navigate through the use of tactile sense, while using his visual sense for safely hiking e.g. in difficult terrain. Furthermore, this invention provides the advantage the human may also navigate in poor light conditions.

The navigation system also comprises a processing unit. The processing unit performs several steps to control the navigation system. The processing unit typically cycles through these steps. The processing unit may start with receiving the compass direction from the compass sensor. The compass sensor may be communicating with the processing unit via a dedicated communication channel, such as hard wired or RS-232 between the compass sensor and the processing unit. The compass sensor may be communicating with the processing unit via a shared medium, such as a bus communication system, e.g. USB. The compass sensor may be communicating with the processing unit wireless, such as via WiFi, Bluetooth or ZigBee.

The processing unit may continue with retrieving a waypoint defining the point where to the human is navigating. Retrieving may be from an internal memory. Retrieving may be from a memory that was set according to the information from an external information source. Retrieving may be from an external information source. The external information source may be a laptop or computer, typically providing the information before the hike. The external information source may be a smartphone or GPS navigator, typically providing the information during the hike.

The processing unit may continue with retrieving the current position of the human. The current position may be based on a GNSS sensor, such as a GPS, GLONASS, Galileo, Beidou and other regional system sensor, providing a location, which is a location an accuracy depending on the GNSS system specifications and the conditions at the current location. The GNSS sensor may be communicating with the processing unit via an information channel comparable or the same as the compass sensor. Alternatively, the current position may be based on a sensor for local or indoor location. Examples of indoor positioning systems are reconfigured WiFi or Bluetooth systems, but may also be Ultra-wide Band, infrared or protocols using optical or acoustic signals.

The processing unit continues with determining a bearing based on the waypoint and the current position. The processing unit at least has to have executed the steps of retrieving the waypoint and retrieving the current position in arbitrary order at least once. The processing unit may have executed the step of retrieving the current position multiple times for providing a more accurate current position though statistical analyses, such as averaging and/or regression. The bearing may be based on subtracting the current position from the waypoint for obtaining a vector from the current position to the waypoint. The direction of the vector indicates the bearing.

The processing unit continues with determining an alignment based on the bearing and the compass direction. The determining step may comprise comparing the bearing and the compass direction, such as subtracting the two directions, resulting in a comparison providing an indication of the alignment of the bearing and the compass direction. The bearing may alternatively be labelled a heading direction.

The processing unit continues with activating the tactile unit based on the alignment. Typically, the bearing and the compass direction should align providing an indication that the human navigating is facing in the right direction. Aligning means that the bearing and the compass direction are substantially the same. In the alignment calculation, a correction for typical offsets may apply. The tactile unit is typically only activated when the tactile unit and/or the compass sensor faces the required direction.

The processing unit may execute the preceding steps in a loop for providing the human navigating updates of its alignment with the waypoint over time. A particular step may be executed multiple times relative to another step for example for allowing statistics to be applied to the first step for obtaining a higher accuracy. One or more of the preceding steps may be executed in parallel. The steps of receiving the compass direction, determining an alignment and activating the tactile unit may be executed multiple times to interpolate between moments in time of executing the step of retrieving a current position. The step of retrieving a current position may have a time interval of around 1 second.

A typical offset may be the relative orientation difference between the compass sensor and the tactile unit. The compass sensor is arranged to the belt. This arrangement is typically that the compass sensor orientation relative to the belt does not vary substantially while navigating. The tactile unit is also arranged to the belt. For this arrangement it is typically also that the tactile unit orientation relative to the belt does not vary substantially while navigating. Thus, the relative orientation of the compass sensor and the tactile unit to each other while navigating, which is in use, does not vary substantially relative to each other. And even if the compass sensor varies relative to the belt, most of the time typically the tactile unit varies in the same way. Thus, even then the relative orientation of the compass sensor and the tactile unit to each other while navigating does not vary substantially relative to each other. This provides the advantage of allowing a substantially even, stable or equal compensation over time for the relative orientation difference between the compass sensor and the tactile unit.

For the navigation system, the tactile unit is typically arranged to the belt coupling. Arranging the tactile unit to the belt coupling provides the advantage of locating the tactile unit at a very stable location for the circumference defined by the belt. Furthermore, the belt coupling typically lines up with the umbilicus of the human navigating. The umbilicus or belly button is typically in line with the human's head. Thus, arranging the tactile unit with the belt coupling provides the advantage of lining up the tactile unit with the head. When the tactile unit is now activated, because the bearing and the compass direction align, the human will feel a tactile signal around his umbilicus and will tend to turn his head face forward. The result is that the human navigating has the natural tendency to face the direction he has to travel to the next waypoint. This provides the advantage that the human may still use its visual sense for hiking while also navigating. As a further advantage, the umbilicus is perceived by the user as straight forward, even if the head is turned. This has the technical effect of navigating even when the head is facing in another direction.

Furthermore, while the activation of the tactile unit may distort the working of the compass sensor. The distortion may be that the tactile unit radiates an electromagnetic field, typically during activation, distorting the earth's magnetic field in the vicinity of the tactile unit. The compass sensor is typically arranged far away from the tactile unit. Typically, the compass sensor is arranged halfway or substantially half way, the belt, such that in use the compass sensor is arranged to, next to or adjacent to the spine of the human navigating and the tactile unit is arranged to the belt coupling, which is in use arranged to, next to or adjacent to the umbilicus of the human navigating, providing the advantage of locating the compass sensor far away from the tactile unit minimizing disturbance or additional tactile actuators. Furthermore, the spine provides a relatively stable platform minimally influenced by e.g. respiration.

In an embodiment of the invention, one of the activating steps activate one of the additional tactile actuators and/or the tactile unit when the bearing and the compass direction align within an alignment range. Typically, the bearing and the compass direction won't align perfectly. The one of the additional tactile actuators and/or the tactile unit should advantageously already be activated if the difference between the bearing and the compass direction is within an alignment range. The alignment range may differ per application of the navigation system. The alignment range may also change dynamically. For example, the alignment range may differ depending on the distance from the waypoint. Furthermore, the alignment range may differ depending on the speed the navigation system and thus the user is travelling. The alignment range may differ also depend on the presence of other tactile units as introduced below, wherein the other tactile units indicate other directions. The alignment range is typically arranged symmetrically around 0 degrees. The alignment range may be −30 to +30 degrees, preferably −20 to +20 degrees, more preferably −10 to +10, even more preferably −5 to +5 degrees, most preferably −3 to +3 degrees.

In an embodiment of the invention, the tactile unit is arranged under the belt coupling. This provides the advantage that the user wearing the belt may easily locate the tactile unit for improved arranging of the tactile unit to the umbilicus of this user. Furthermore, arranging the tactile unit under the belt coupling provides the advantage that the belt coupling does not inhibit the tactile unit to communicate the direction to the user.

In an embodiment of the invention, the tactile unit comprise a single tactile actuator. This allows for a simple and cost-effective navigation system.

In an embodiment of the invention, the tactile unit comprises two tactile actuators arranged at opposite sides relative to the middle of the belt coupling, preferably at an equal distance from the middle of the belt coupling. The tactile actuator may be activated with different amplitude, waveform shape or phase. This allows for interpolating between the two tactile actuators. This advantageously allows for more accurate tactilely communicating the alignment to the human wearing the navigation system.

In an embodiment of the invention, the belt comprises a nonelastic material for providing the belt in a longitudinal direction with an invariable length. The tactile unit and/or the compass sensor are advantageously kept at a certain position on the body. This advantage is further enhanced if the tactile unit and/or the compass sensor are kept at a certain position on the body after calibration and/or configuration of the belt. If the tactile unit and/or the compass sensor are kept at a certain position on the body, this has the effect that the alignment or miss alignment in case of multiple tactile actuators may be communicated more accurate. Nonelastic may be nonstretchable, inelastic or non-flexible. A material is considered nonelastic if the material may stretch a maximum of 5%, preferably 3%, more preferably 2%, most preferably 1%, before breaking. Furthermore, the belt may be provided with fine adjustment, for example near the belt coupling, for making limited adjustments to the length of the belt in the longitudinal direction for fitting the belt to the circumference of a body as further explained below.

In an embodiment of the invention, the navigation system comprises additional tactile actuators arranged to the belt and for communicating a direction to the human, wherein the additional tactile actuators are distributed over the length of the belt, preferably evenly distributed over the length of the belt when also taking the tactile unit into account, more preferably distributed mainly to the ends of the belt, wherein the processing unit is also configured for the steps of:
    associating one of the additional tactile actuators with a deviation from the alignment; and
    activating one of the additional tactile actuators based on the deviation from the alignment. The additional tactile actuators advantageously allow the human wearing the navigation system to also get navigation guidance, when this human is travelling in a direction which is not aligned by experiencing a tactile communication at another position along the belt. Furthermore, the additional tactile actuators allow the tactile communication to have a smaller granularity for advantageously providing a more accurate navigational guidance to the human wearing the belt. Furthermore, the additional tactile actuators arranged at different locations along the belt advantageously when activated causes the human wearing the belt to turn his head and/or torso towards the bearing, typically followed by moving, travelling or hiking towards the bearing.

In an embodiment of the invention, the belt comprises an elongated compartment, wherein at least a part of the tactile unit is arranged inside the elongated compartment. The elongated compartment simplifies the cabling between the different parts of the navigation system in the elongated compartment as these cables may be tucked into the elongated compartment. Preferably only one, or two cables at different locations, such as at each end of the elongated compartment, have to enter the elongated compartment for communicating with and providing power to the different parts of the navigation system. The elongated compartment also advantageously allows the cables to run in loops or curves to provide a flexible and stretchable navigation system.

In an embodiment of the invention, the belt comprises:
    a compartment opening for accessing the elongated compartment; and
    a closing element, such as hook-and-loop fastener or a zipper, for closing the elongated compartment, wherein the compartment opening is arranged to a long edge of the elongated compartment, preferably to a long bottom side edge of the elongated compartment.

Typically, the closing element is thicker and less flexible compared to other parts of the wall of the compartment. Arranging the closing element to an edge of the compartment advantageously allows to prevent the closing element to become a pressure point when arranged between the tactile unit or tactile actuators and the human skin. Furthermore, arranging the closing element to an edge of the compartment advantageously allows insertion of parts of the navigation system in the elongated compartment via the side for simplifying the insertion by lifting only one side up of the elongated compartment. The closing element is preferably arranged to a bottom side of the elongated compartment, because the user typically identifies the closing element as bottom side, thus preventing the user from wearing the navigation system upside down. The closing element is preferably arranged to a long bottom side of the elongated compartment, more preferably over the complete length of the long bottom side of the elongated compartment, for an easy and full access to the elongated compartment.

In an embodiment of the invention, the navigation system comprises an elongated mesh having a size configured for arranging the elongated mesh inside the elongated compartment, wherein the additional tactile actuators and preferably also at least a part of the tactile unit are arranged to the mesh. The mesh may be arranged to the additional tactile actuators when moulding the additional tactile actuators. The mesh typically runs through the moulded additional tactile actuators. In this case the mesh is typically also suitable for withstanding the moulding temperatures. This provides the advantage that the mesh is inseparable from the additional tactile actuators.

The moulding of the mesh into the additional tactile actuators requires during the moulding procedure that the at least two parts of the mould are separated by the thickness of the mesh. This separation limits the amount of pressure on the material in the mould as well as the temperature of the material in the mould. If either of the two or both become too much for a given mould material, the mould material is pressed through the separation between the at least two mould parts. On the other hand, the temperature and pressure should be high enough for a particular type of mould material to fill the mould completely. The right balance between temperature, pressure and mould material is part of the craftsmanship of the skilled person.

In an embodiment of the invention, the mesh is made of a nonstretchable material for providing the mesh in a longitudinal direction with an invariable length. The mesh is typically a highly bendable and/or nonstretchable material. The nonelastic mesh, especially the direction of nonelasticity, provides the advantage that the additional tactile actuators have an improved fixation to the belt and cannot slide or slip to another location, thus the accuracy of the navigation system is better maintained over time during use.

In an embodiment of the invention, the mesh comprises a mesh coupling arranged to an end of the mesh for coupling the mesh to the belt at a location close or at the belt coupling. This provides the advantage of improving the fixation of the mesh with the belt and thus improves the maintaining of the accuracy of the navigation system over time in use.

In an embodiment of the invention, the navigation system comprises an inside spacer material in use arranged between the tactile unit and the human. The inside spacer advantageously increases comfort for the wearer of the belt and advantageously minimizes the possibility of pressure points. The inside spacer material comprises preferably open space for advantageously allowing air to flow for preventing uncomfortable sweat spots under the tactile unit. The inside spacer material is preferably a material that advantageously minimizes the dampening of the tactile vibrations from the tactile unit. The inside spacer material is preferably a material comprising two layers separated by pillars. The pillars in the material are typically flexing or absorbing motions parallel to the layers and pass on motions perpendicular to the layers. The inside spacer material has the technical effect of preventing stiffer materials, such as the belt or parts of the belt to resonate with the tactile actuators. This provides the advantage that the belt becomes slightly less noisy or quiet when the tactile actuators are active.

In an embodiment of the invention, the navigation system comprises an inside spacer material in use arranged between the additional tactile actuators and the human. This provides the same advantages as mentioned in the preceding paragraph.

In an embodiment of the invention, the navigation system comprises an inside spacer material arranged inside the elongated compartment. This provides the same advantages as mentioned in the two preceding paragraphs. This also provides the advantage that the inside spacer material is kept away from direct contact to dirt and other material degrading effects. In a further embodiment of the invention, the inside spacer is adapted to the size of the elongated compartment for snugly fitting the inside spacer together with at least the tactile actuators for arranging or fixating the tactile actuators inside the elongated compartment. In a further embodiment of the invention, the inside spacer material is part of a wall of the elongated compartment.

In an embodiment of the invention, the navigation system comprises an outside spacer material in use arranged on an outside of the tactile unit relative to the human. The outside spacer material may also be arranged around the tactile unit, but not between the tactile unit and the human, as this is the area for the inside spacer material. The outside spacer material provides the advantage that pressure points of the navigation system on the body are reduced. The outside spacer material further provides the advantage of reducing the sound produced by the tactile unit. The outside spacer material has the technical effect of preventing stiffer materials, such as the belt or parts of the belt to resonate with the tactile actuators. This provides the advantage that the belt becomes less noisy or quiet when the tactile actuators are active. The outside spacer material is typically a foam material. The outside spacer material may be a material having air trapped in the material in for example closed spaces in the material. In a further embodiment of the invention, the outside spacer is adapted to the size of the elongated compartment for snugly fitting the outside spacer together with at least the tactile actuators for arranging or fixating the tactile actuators inside the elongated compartment.

In a further embodiment of the invention, the navigation system comprises a filler material adapted to the size of the elongated compartment for snugly fitting the filler material together with at least the tactile actuators for arranging or fixating the tactile actuators inside the elongated compartment. The filler material may be foam.

In an embodiment of the invention, the navigation system comprises an outside spacer material in use arranged on an outside of the additional tactile actuators relative to the human. The same facts and advantages of the preceding paragraph apply to this embodiment relating to the additional tactile actuators.

In an embodiment of the invention, the belt coupling comprises:
 a buckle; and
 a buckle receiver arranged for cooperating with the buckle for forming a belt coupling;
wherein the tactile unit is arranged to the buckle or the buckle receiver. The buckle may comprise a protrusion and the buckle receiver a hole for receiving the protrusion.

The buckle may have a first shape and the buckle receiver may have a second shape, wherein the first shape and the second shape are shaped to cooperate for forming a coupling. The first and second shape may be shaped to snap together for forming the coupling. The coupling is preferably a releasable coupling. The tactile unit is typically arranged to the part of the belt coupling that is arranged closest to the human in use, this provides the advantage that the tactile communication is not hampered or limited by the buckle or the buckle receiver.

In an embodiment of the invention, the belt comprises a fine adjustment element for fine adjusting the length of the belt, wherein the fine adjustment element is arranged between the buckle and the belt and/or the buckle receiver and the belt. The fine adjustment is advantageously arranged at the front of the human when wearing the belt, such that the fine adjustment can be adjusted while wearing the belt.

In an embodiment of the invention, the belt comprises a coarse adjustment element for coarse adjusting the length of the belt, wherein the coarse adjustment element is arranged such that the belt's length is changed halfway between the opposing ends of the belt, preferably halfway the length of the belt, more preferably when having an even number of additional tactile actuators dividing the additional tactile actuators in two even groups, preferably wherein the coarse adjustment element only allows the belt length to be adjusted at one position. Typically, the tactile actuators are arranged to the front of the human wearing the belt as the human is typically walking or facing into the direction of the next waypoint. Thus, the tactile actuators are arranged to the ends of the belt. The tactile actuators arranged on the belt's ends are thus most important and therefore should be as accurate as possible. Having the coarse adjustment halfway the belt advantageously allows the tactile actuators to be located as near as possible to the predefined position and/or direction. Furthermore, the deviation from the predefined direction is advantageously the smallest near the ends of the belt, which is accuracy the most important as this is the point that the user typically uses as reference.

In an embodiment of the invention, the coarse adjustment element comprises a coupling, preferably a hook-and-loop fastener, arranged inside the elongated compartment. This embodiment provides the advantage that the coupling cannot be simply decoupled as it is inside the elongated compartment. Furthermore, the hook-and-loop fastener provides for an easily decouplable by a perpendicular force and still strong coupling in a lateral force. Hook-and-loop is also known under the tradename Velcro.

In a further embodiment of the invention, the hook-and-loop fastener is arranged in a first hook-and-loop elongated compartment parallel and independently accessible from the first elongated compartment. Typically, the hook-and-loop fastener is adapted much more compared to changes to the tactile actuators or their wiring. The tactile actuators are for example typically removed when the belt is cleaned, such as washed. This separation from the hook-and-loop fastener and the tactile actuators provides the advantage that the user adjusting the length of the belt does not temper with or damage the tactile actuators or their wiring, thus extending the lifetime of the navigation system.

In an embodiment of the invention, the first elongated compartment and/or the first hook-and-loop elongated compartment have an opening allowing the respective compartment to be folded open for providing full access, preferably to all inside surfaces of the respective compartment.

In an embodiment of the invention, the belt comprises a second elongated compartment, wherein the elongated compartment is arranged between the first belt end and halfway the belt length and the second elongated compartment is arranged between the second belt end and halfway the belt length. This embodiment advantageously allows to place all additional tactile actuators in one of the elongated compartments.

In an embodiment of the invention, the belt comprises two lobes arranged on both sides of the middle of the belt and in use on the bottom side of the belt. The two lobes may advantageously provide an ergonomic shape to the belt. The two lobes may advantageously relieve pressure from for example a backpack worn on top of the belt. The two lobes may advantageously direct the user to identifying the bottom side of the belt in a more natural way.

In an embodiment of the invention, the processing unit is also configured for the steps of retrieving a compass compensation, wherein the determining the alignment step is also based on the compass compensation. Declination is the deviation between the magnetic North and the geographical north pole at a specific location on earth. Declination greatly depends on the location on earth and also varies over time. The navigation system advantageously compensates for the declination as part of the compass compensation. The retrieved compass compensation may thus depend on the current position. In specifically this embodiment of the invention and the following embodiments concerning calibration, the feature that the tactile unit is arranged to the belt coupling may be considered not essential.

In an embodiment of the invention, the processing unit is also configured for the steps of:
receiving an indication that the tactile unit is facing a specified direction;
calculating a difference between the specified direction and the current compass direction; and
storing the difference as the compass compensation.

These steps may be used to determine the compass compensation for example during calibration of the navigation system. Also, every time the belt is put on by the user, the belt may be positioned slightly different. Also, the alignment of the compass sensor and the tactile unite may differ slightly. Furthermore, the compass sensor and the tactile unit typically always have a directional offset from each other as the compass sensor is typically arranged to the spine and the tactile unit relatively far away typically arranged to the umbilicus. The difference between the direction of the compass sensor due to e.g. unevenness of the spine surface and/or the location of the tactile unit on the torso may also be part of the compass compensation. To improve the accuracy of the belt, the belt may be calibrated every time the belt is put on. If the current position is known and for example the location of an object further away, the specified direction may be the direction specified by subtracting the two location. The specified direction may also be determined with the help of a map in combination with an object with at a specific location.

In an embodiment of the invention, the navigation system comprises an interface for inputting the specified direction; wherein the processing unit is also configured for the step of receiving the specified direction from the interface. This allows for a simple entry of the specified direction in the navigation system.

In an embodiment of the invention, the specified direction is North or True North. This advantageously allows to simplify the calibration to one button.

In an embodiment of the invention, the navigation system comprises an interface for inputting locations; wherein the processing unit is also configured for the steps of:
receiving a digital map;
receiving a first location from the interface;
receiving a second location from the interface;
calculating the specified direction based on the first location and the second location. This advantageously allows to calibrate in any specified direction the navigation system. In an alternative embodiment, the step of the second location from the interface may be replaced by the step of receiving the current position of the human.

In an embodiment of the invention, the processing unit is also configured for the steps of:
receiving a first GNSS location from a GNSS sensor at a first moment in time;
receiving a second GNSS location from the GNSS sensor at a second moment in time, wherein the human wearing the navigation system has travelled a distance in a straight line;
receiving at least one compass direction around or during the time interval between the first and the second moment in time;
calculating a GNSS direction by subtracting the first GNSS location from the second GNSS location;
calculating a difference between the GNSS direction and the at least one compass direction; and
storing the difference as the compass compensation. This embodiment advantageously allows to determine or calibrating the compass compensation without any reference object. This embodiment provides a simplified calibration of the compass compensation as this embodiment allows a one button interface. In an alternative embodiment, The GNSS locations may be replaced by locations from an indoor positioning system or a local outdoor positioning system, which is local to a specific region or area.

In an embodiment of the invention, the processing unit is also configured for the steps of:

receiving a plurality of compass directions around or during the time interval between the first and the second moment in time; and calculating the compass direction based on the plurality of compass directions. The accuracy of the compass compensation is greatly improved by averaging a plurality of compass directions. Also, the plurality of compass directions allows for the navigation system to check if the straight line is straight enough for the navigation system to determine a compass compensation with a particular accuracy.

In an embodiment of the invention, the navigation system comprises an interface for inputting a reference location; wherein the processing unit is also configured for the steps of:

receiving the reference location;

receiving an indication that the tactile unit is facing the reference location;

receiving the GNSS location from a GNSS sensor;

calculating a GNSS direction by subtracting the GNSS location from the reference location;

calculating a difference between the GNSS direction and the compass direction; and storing the difference as the compass compensation. This advantageously allows to calibrate in any specified direction the navigation system.

In an embodiment of the invention, the processing unit is further configured for the steps of:

determining a course based on a first position and a second position of the human; and determining a course alignment based on the course and the bearing; and wherein the step of activating comprises activating the tactile unit and/or one of the additional tactile actuators with an activation pattern based on the course alignment. The course is the actual direction the navigation system and thus the human is travelling. An example is when the human is not having its torso aligned with the direction a vehicle is driving, such as when seated transverse or athwart. Another example is when the human is paddling in an inflatable craft with cross wind. The inflatable craft will then drift with the wind causing the inflatable craft to move in a direction labelled course. In these examples, the bearing may deviate from the course.

The course is based on the difference between at least two measurements of the position of the navigation system or human wearing the belt. The determining of the course may be aided with other measurements, such as measurements from an accelerometer. Readings from the accelerometer may also replace the second position value. In specifically this embodiment of the invention, the feature that the tactile unit is arranged to the belt coupling may be considered not essential.

The activation pattern is based on the alignment or difference in alignment of the course and the bearing. As an example, the user may receive an indication of the bearing by the activation of one or more the tactile actuators, which does not have to be the central front tactile actuator, while the user also receives an indication of the course by the same one or more tactile actuators e.g. indicating that the user is moving in correct direction based on the course. The pattern may be activating the one or more tactile actuators according with different frequencies, intervals, interval periods and/or duty cycles. The pattern may be an amplitude pattern, such as fading in and/or out. The pattern may differ for positive and negative deviations between the course and bearing.

According to another aspect of the invention, a method for a navigation system for aiding a human navigating, wherein the navigation system comprises:

a belt having a belt length and opposite belt ends, and comprising an elongated compartment;

a belt coupling arranged to the belt for coupling the belt ends;

a compass sensor arranged to the belt and for sensing the compass direction based on the earth's magnetic field; and a tactile unit arranged for tactile communicating a direction to the human, wherein the tactile unit is arranged to the belt coupling;

additional tactile actuators arranged to the belt and for communicating a direction to the human, wherein the additional tactile actuators are distributed over the length of the belt;

an elongated mesh having a size configured for arranging the elongated mesh inside the elongated compartment, wherein the additional tactile actuators are arranged to the mesh;

wherein the belt comprises a nonelastic material for providing the belt in a longitudinal direction with an invariable length, and wherein the additional tactile actuators are arranged inside the elongated compartment; and wherein the method comprises the steps of:

receiving a compass direction from the compass sensor;

retrieving a waypoint defining the point where to the human is navigating;

retrieving a current position of the human;

determining a bearing based on the waypoint and the current position;

determining an alignment based on the bearing and the compass direction; and associating one of the additional tactile actuators with a deviation from the alignment;

activating one of the additional tactile actuators based on the deviation from the alignment; and activating the tactile unit based on the alignment.

In an embodiment of the invention, the navigation system comprises:

a belt having a belt length and opposite belt ends;

a belt coupling arranged to the belt for coupling the belt ends;

a compass sensor arranged to the belt and for sensing the compass direction based on the earth's magnetic field; and a tactile unit arranged for tactile communicating a direction to the human;

wherein the method comprises the steps of:

receiving a compass direction from the compass sensor;

retrieving a waypoint defining the point where to the human is navigating;

retrieving a current position of the human;

retrieving a compass compensation;

determining a bearing based on the waypoint and the current position;

determining an alignment of the bearing, the compass direction and the compass compensation; and activating the tactile unit based on the alignment.

In an embodiment of the invention, the method incorporates any of the features or steps of the navigation system embodiments.

According to another aspect of the invention, a computer program product comprising a computer readable medium having computer readable code embodied therein, the computer readable code being configured such that, on execution by a suitable computer, a suitable processor or a suitable processing unit; the computer, the processor or the processing unit is caused to perform the steps of the method of any of the embodiments.

According to another aspect of the invention, a navigation system for aiding a human navigating or a bearing indication system for aiding a human determining a bearing, comprising:
- a belt having a belt length and opposite belt ends;
- a belt coupling arranged to the belt for coupling the belt ends;
- a compass sensor arranged to the belt and for sensing the compass direction based on the earth's magnetic field;
- a tactile unit arranged for tactile communicating a direction to the human; and
- a processing unit configured for the steps of:
- retrieving a bearing;
- determining an alignment based on the bearing and the compass direction; and
- activating the tactile unit based on the alignment;
- wherein the tactile unit is arranged to the belt coupling.

In an embodiment of the invention, the step of retrieving a bearing comprises the steps of:
- receiving the compass direction from the compass sensor;
- retrieving a waypoint defining the point where to the human is navigating;
- retrieving a current position of the human;
- determining a bearing based on the waypoint and the current position.

In an embodiment of the invention, the method incorporates any of the features or steps of the navigation system embodiments.

According to another aspect of the invention, a bearing indication system for aiding a human determining a bearing, comprising:
- a belt having a belt length and opposite belt ends;
- a belt coupling arranged to the belt for coupling the belt ends;
- a compass sensor arranged to the belt and for sensing the compass direction based on the earth's magnetic field;
- a tactile unit arranged for tactile communicating a direction to the human; and
- a processing unit configured for the steps of:
- receiving the compass direction from the compass sensor;
- retrieving a bearing;
- determining an alignment based on the bearing and the compass direction; and
- activating the tactile unit based on the alignment;
- wherein the tactile unit is arranged to the belt coupling.

In an embodiment of the invention, the bearing indication system comprises a communication interface for receiving a bearing and wherein the step of retrieving a bearing comprises receiving a bearing via the communication interface. The communication interface may be a user communication interface, such as a touchscreen, keyboard, mouse, speech interface or voice interface. The communication interface may be a machine-to-machine communication interface, such as USB, WiFi, RS-232 or Bluetooth. The origin of the machine-to-machine communication interface may be a directional sensor unit triggering to a sound in the surrounding, wherein the bearing is an indication of the direction of the origin of the sound.

In an embodiment of the invention, the bearing indication system incorporates any of the features or steps of the navigation system embodiments.

In an embodiment of the invention, specifically for this aspect of the invention, the feature that the tactile unit is arranged to the belt coupling may be considered not essential.

According to another aspect of the invention, a navigation system for aiding a human navigating, comprising:
- a belt having a belt length and opposite belt ends;
- a belt coupling arranged to the belt for coupling the belt ends;
- a compass sensor arranged to the belt and for sensing the compass direction based on the earth's magnetic field;
- a tactile unit arranged for tactile communicating a direction to the human; and
- a processing unit configured for the steps of:
- receiving the compass direction from the compass sensor;
- retrieving a waypoint defining the point where to the human is navigating;
- retrieving a current position of the human;
- determining a bearing based on the waypoint and the current position;
- determining an alignment based on the bearing and the compass direction; and
- activating the tactile unit based on the alignment;
- wherein the tactile unit is arranged to the belt coupling.

BRIEF DESCRIPTION OF THE DRAWINGS

The invention will be apparent from and elucidated further with reference to the embodiments described by way of example in the following description and with reference to the accompanying drawings, in which.

The figures are purely diagrammatic and not drawn to scale. In the figures, elements which correspond to elements already described may have the same reference numerals.

DETAILED DESCRIPTION OF THE FIGURES

Figure 1:
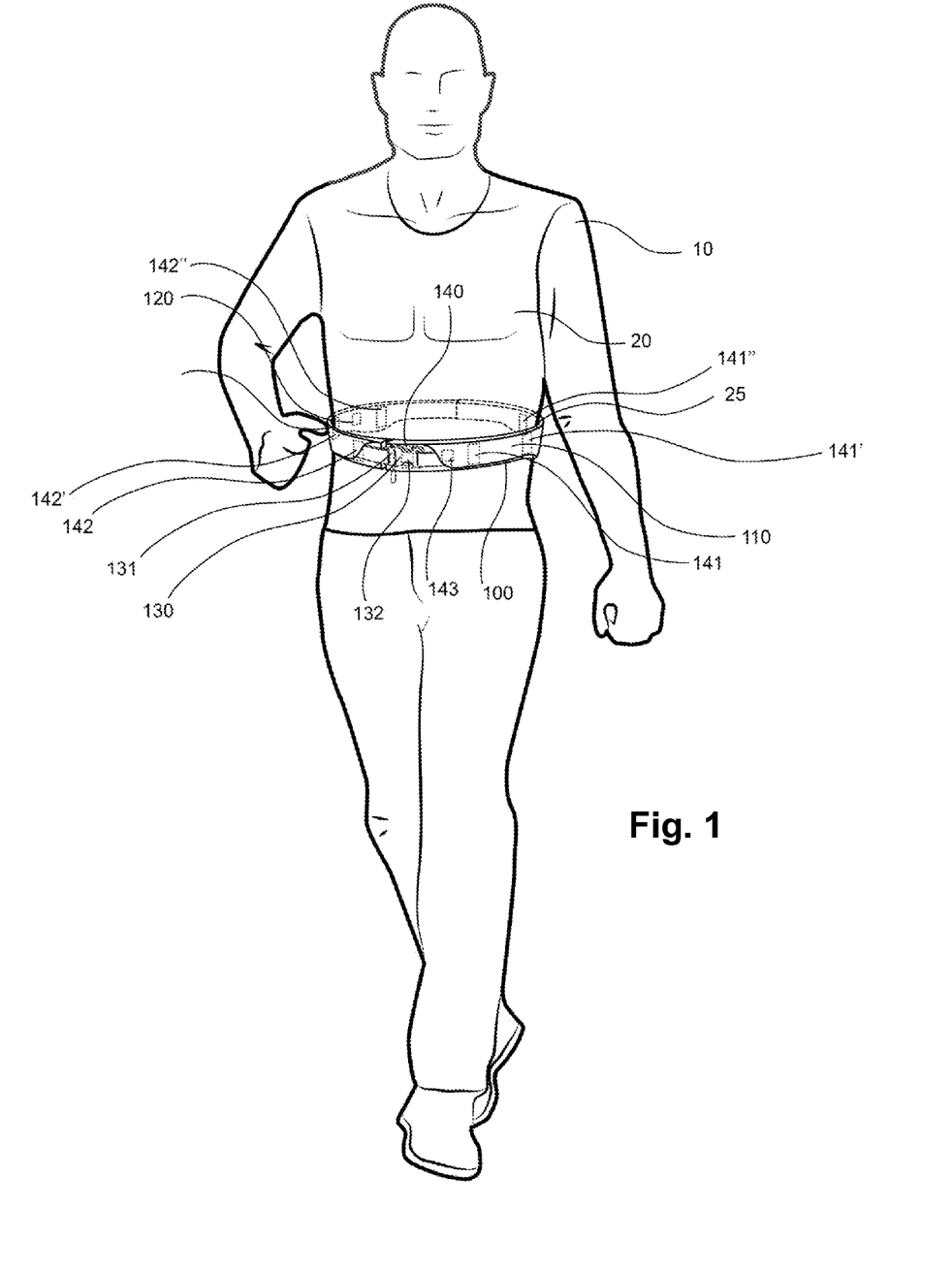
FIG. 1 schematically shows a perspective view of a user wearing a first embodiment of the navigation system.

FIG. 1 schematically shows a perspective view of a user 10 wearing a first embodiment of the navigation system 100. The navigation system comprises a belt 110, a compass sensor 120, a belt coupling 130, a processing unit 143 and a tactile unit 140.

Figure 2:
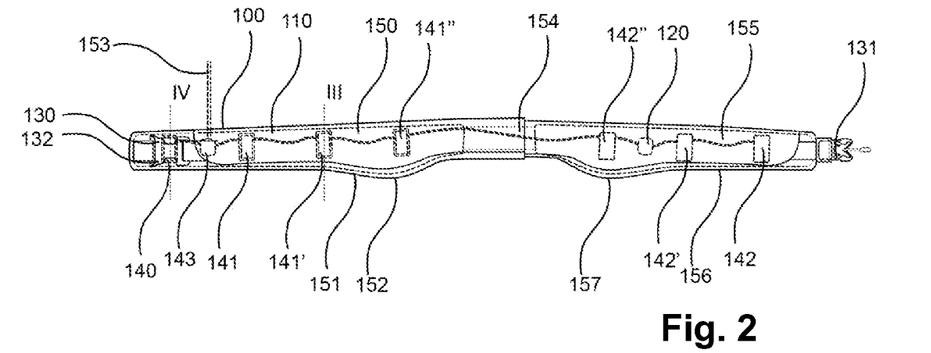
FIG. 2 schematically shows the first embodiment of the navigation system, wherein the belt is laid out.

The belt 110 has a belt length and opposite belt ends spaced apart by the belt length. The belt coupling 130 is arranged to the belt 110 for coupling the belt ends. In the uncoupled condition, the belt coupling 130 may be split in a buckle 131 and a buckle receiver 132 as shown in FIG. 2.

The compass sensor 120 is a magnetic sensor for sensing the magnetic field of the earth. The compass sensor 120 is typically arranged to a location with few metal or magnetic objects, such that these don't interfere with the measurement of the compass sensor 120.

The belt 110 is typically worn around the waist 25 with the tactile unit 140 arranged to the belt coupling 130. The tactile unit 140 is typically arranged under the belt coupling 130, as the belt coupling 130 is typically aligned with the umbilicus of the user. This has the advantage that the tactile unit 140 is facing the natural direction of travel of the user 10. The tactile unit 140 may comprise a tactile actuator for tactile communication with the user 10. The tactile unit 140 may communicate via other means providing a tactile sensation, such as electric shocks or sound waves. The alignment of the tactile unit 140 provides the advantage that the navigation system is able to tactile communicate to the user if the user 10 is facing towards the waypoint.

The processing unit 143 functionally couples the compass sensor 120 and the tactile unit 140. The processing unit 143 is further functionally arranged to receive waypoint information specifying the point or location where the user 10 wants to navigate to. The processing unit 143 may be physically combined with the tactile unit 140 or may be physically separated.

FIG. 2 schematically shows the first embodiment of the navigation system, wherein the belt 110 is laid out.

The belt 110 may further comprise a first set of additional tactile actuators 141, 141', 141" and a second set of additional actuators 142, 142', 142". The belt 110 may further comprise a first elongated compartment 150 and a second elongated compartment 155 comprising the first set of additional tactile actuators 141, 141', 141" and the second set of additional tactile actuators 142, 142', 142" respectively.

The additional tactile actuators 141, 141', 141", 142, 142', 142" allow for tactile communicating with the user 10 in case the user 10 is heading or navigating in a compass direction not aligned with the bearing. The additional tactile actuators 141, 141', 141", 142, 142', 142" have the effect that the tactile communication of these actuators allow to indicate that the user 10 is heading or navigation off course by applying the tactile communication to another position on the body, such as another position around the waist 25. The belt 110 defines a circumference around the body or waist 25. The tactile unit 140 and additional tactile actuators 141, 141', 141", 142, 142', 142" are typically arranged along this circumference for applying tactile communication along this circumference. The tactile communication along this circumference may be enhanced by interpolating between the different tactile actuators 141, 141', 141", 142, 142' 142" and/or between the tactile unit 140 and the tactile actuators 141, 141', 141", 142, 142', 142". This interpolation provides the advantage that with a particular set of tactile actuators 141, 141', 141", 142, 142', 142" the granularity of the tactile communication is enhanced.

The navigation system preferably may use an AHRS or Attitude and Heading Reference System as compass sensor. The AHRS typically combines a magnetometer with an accelerometer and/or a gyroscope for enhancing the accuracy. The magnetometer typically measures the earth magnetic field. The AHRS typically also measures the direction of the gravitational force. The AHRS measures typically in three dimensions, such that the orientation or attitude of the AHRS is measured relative to the gravitational vector and the direction of the magnetic north. The AHRS typically combines or fuses the measurements of the different sensors for enhancing the accuracy of the orientation or attitude measurement using a sensor fuse algorithm. The AHRS may also be labelled a 9-DOF or 9 Degrees Of Freedom compass.

The first elongated compartment 150 and the second elongated compartment 155 are typically accessible through a first bottom side opening 151 and a second bottom side opening 156, respectively. The electronic components are typically connected via wires with each other in a bus or daisy chain topology. The elongated compartments 150, 155 have typically openings for running these wires. The first and second bottom side opening 151, 156 allow for the additional tactile actuators 141, 141' 141", 142, 142', 142" to be safely placed inside the elongated compartment 150, 155, while in other circumstances, such as washing of the belt 110, the additional tactile actuators 141, 141', 141", 142, 142', 142" may be temporarily removed from the elongated compartments 150, 155.

The additional tactile actuators 141, 141', 141", 142, 142', 142" may be arranged to a mesh 165 for improving the stability of the position of the additional tactile actuators 141, 141', 141", 142, 142', 142" in the elongated compartments 150, 155. The mesh 165 is typically non-elastic in the elongated direction of the elongated compartments 150, 155. The additional tactile actuators 141, 141', 141", 142, 142', 142" may be moulded onto the mesh 165 for permanently link the additional tactile actuators 141, 141', 141", 142, 142', 142" to the mesh 165.

The belt 110 may comprise a first lobe 152 and a second lobe 157. The lobes improve the ergonomics of the belt. Furthermore, the lobes 152, 157 may also improve the recognition of what is the bottom side of the belt 110, such that the belt 110 is not worn upside-down.

The navigation system 100 may comprise an information link 153. The information link 153 may be a cable functionally capable of carrying information, such as a USB-cable or Firewire-cable. The information link 153 may be functionally coupled to the processing unit 143 for providing waypoints and/or current positions of the user 10.

Figure 3:
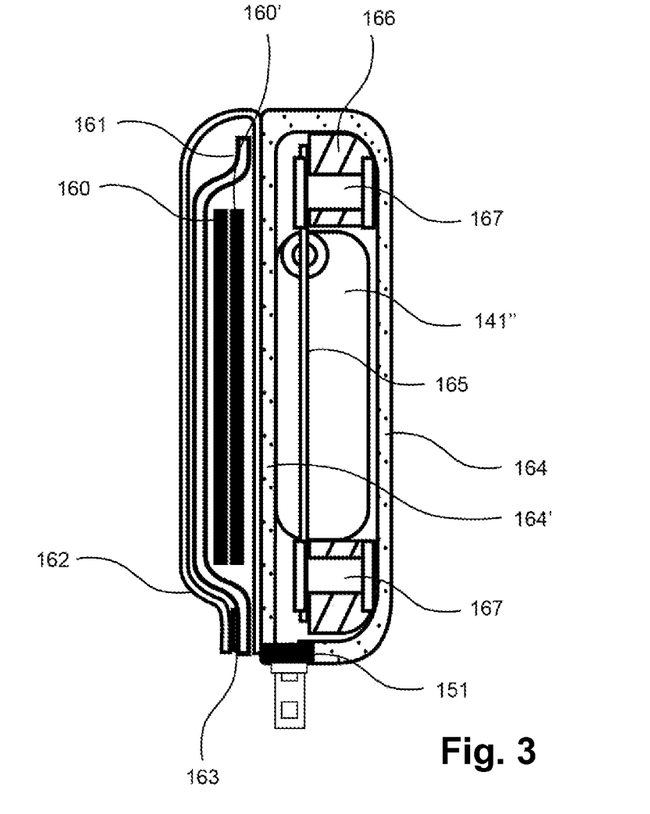
FIG. 3 schematically shows a first cross-section of the first embodiment of the belt of the navigation system as indicated in FIG. 2.

FIG. 3 schematically shows a first cross-section of the first embodiment of the belt 110 of the navigation system 100 as indicated in FIG. 2. The cross-section shows an additional tactile actuator 141" arranged inside the belt 110. The belt 110 may comprise an inside spacer material 164 and an outside spacer material 164', such as a padded textile or as a spacer mesh. The inside spacer material 164 is disposed between the additional tactile actuator 141" and the user 10. The outside spacer material 164' is disposed on an outside of the additional tactile actuator 141", such as between the additional tactile actuator 141" and the sizing straps 160, 160'. The spacer material 164, 164' may advantageously be used to form the first elongated compartment 150 by extending the spacer material 164, 164' to all sides. The first elongated compartment 150 may be accessible through a first bottom side opening 151. The first bottom side opening 151 may be a zipper.

The belt 110 may comprise a mesh 165 moulded into the additional tactile actuators 141, 141', 141", 142, 142', 142" for improving the stability of the position of the additional tactile actuators 141, 141', 141", 142, 142', 142". The stability of the position may further be improved by a foam 166 partly surrounding the additional tactile actuators 141, 141', 141", 142, 142', 142". The foam 166 is typically arranged to sides of the additional tactile actuators 141, 141', 141", 142, 142', 142" which do not interact with the user 10. The sides interacting with the user 10 are the side facing the user 10 and the side facing away from the user 10. The sides not interaction with the user 10 are the sides perpendicular to user 10. The belt 110 may further comprise foam attachments 167, such as rivets, for attaching the foam 166 to the mesh 165 for further stabilizing the position of the additional tactile actuators 141, 141', 141", 142, 142', 142", compass sensor 120 or other electronic components by improving the stability of the position of the mesh 165.

The cross-section shows a first sizing strap 160 and a second sizing strap 160'. The sizing straps 160, 160' are arranged to an outside of the additional tactile actuators 141, 141', 141", 142, 142', 142", such that the sizing straps 160, 160' may apply a pressure on the additional tactile actuators 141, 141', 141", 142, 142', 142" and the tactile unit 140 such that the contact with the user 10 is improved for improved tactile communication with the user 10. The belt 110 may comprise sizing strap loops 161 for arranging the first sizing strap 160 and the second sizing strap 160' to the other parts of the belt 110. The sizing strap loops 161 may have the same effect as strap loops on jeans for holding the belt 110 relative to the jeans.

The first sizing strap 160 and the second sizing strap 160' are typically of a nonelastic material at least nonelastic in a longitudinal direction for fixating and/or determining the length of the belt 110. The first sizing strap 160 is typically fixated to a first end of the belt 110. The second sizing strap 160' is typically fixated to a second end of the belt 110. The first sizing strap 160 and the second sizing strap 160' may comprise each a hook-and-loop surface facing each other for coupling with each other. This configuration allows to adjust the length of the belt 110, typically a coarse adjustment. The hook-and-loop fastener surfaces are typically arranged in one of the elongated compartments 150, 155, such that the coarse adjustment is unexposed to for example the weather while used. Another advantage is that it is prevented that the coarse adjustment is accidentally loosened.

The belt 110 may comprise a cover flap 162 for covering at least partly the sizing straps 160, 160'. The cover flap 162 may comprise a cover flap fixation section 163 for fixating the cover flap 162 over at least partly the sizing straps 160, 160'. The cover flap fixation section 163 is preferably a hook-and-loop strip.

Figure 4:
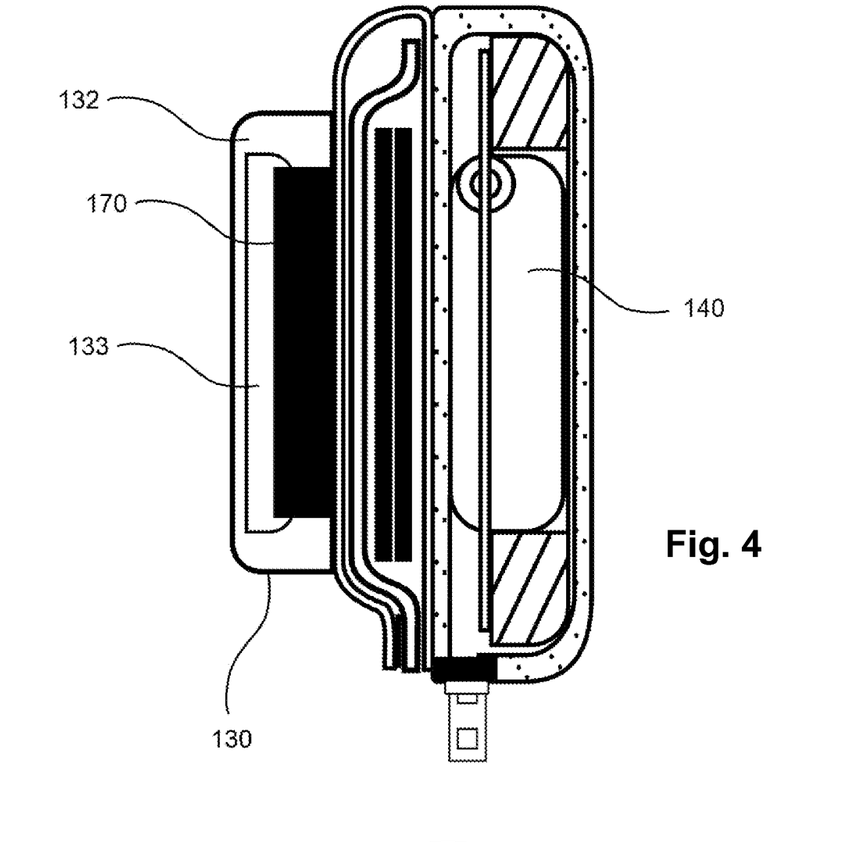
FIG. 4 schematically shows a second cross-section of the first embodiment of the belt of the navigation system as indicated in FIG. 2.

FIG. 4 schematically shows a second cross-section of the first embodiment of the belt 110 of the navigation system 100 as indicated in FIG. 2. The cross-section shows the tactile unit 140 arranged in a particular similar way as the cross-section shown in FIG. 3.

The belt 110 comprises the belt coupling 130. The belt coupling 130 comprises a buckle receiver 132. The belt coupling 130 may further comprise a buckle webbing 170 arranged for fixating the buckle receiver 132 to the belt 110. The buckle receiver 132 further comprises a buckle receiver opening 133 defining a space wherein the buckle 131 may be received.

Figure 5:
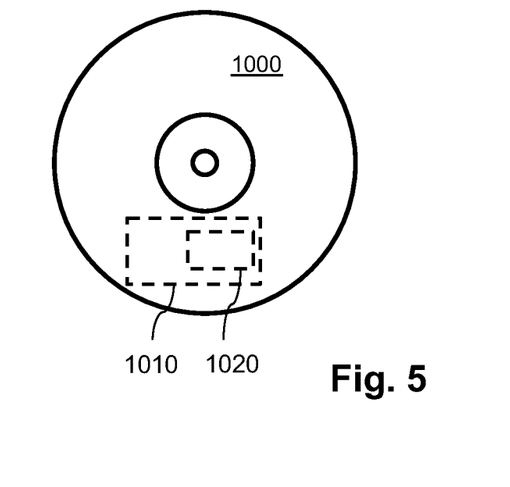
FIG. 5 schematically shows an embodiment of a computer program product.

FIG. 5 schematically shows an embodiment of a computer program product 1000, computer readable medium 1010, and/or non-transitory computer readable storage medium comprising a computer readable code 1020. The computer readable code 1020 implements methods mentioned throughout the description according to the invention.

It should be noted that the figures are purely diagrammatic and not drawn to scale. In the figures, elements which correspond to elements already described may have the same reference numerals.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Examples, embodiments or optional features, whether indicated as non-limiting or not, are not to be understood as limiting the invention as claimed.

| LIST OF REFERENCE NUMERALS | |
| --- | --- |
| 10 | human, user |
| 20 | torso |
| 25 | waist |
| 100 | navigation system |
| 110 | belt |
| 120 | compass sensor |

-continued

LIST OF REFERENCE NUMERALS

| | |
|---|---|
| 130 | belt coupling |
| 131 | buckle |
| 132 | buckle receiver |
| 133 | buckle receiver opening |
| 140 | tactile unit |
| 141, 141', 141" | first set of additional tactile actuators |
| 142, 142', 142" | second set of additional tactile actuators |
| 143 | processing unit |
| 150 | first elongated compartment |
| 151 | first bottom side opening of first elongated compartment |
| 152 | first lobe |
| 153 | information link |
| 154 | halfway length of belt |
| 155 | second elongated compartment |
| 156 | second bottom side opening of second elongated compartment |
| 157 | second lobe |
| 160 | first sizing strap |
| 160' | second sizing strap |
| 161 | sizing strap loop |
| 162 | cover flap |
| 163 | cover flap fixation section |
| 164 | inside spacer material |
| 164' | outside spacer material |
| 165 | mesh |
| 166 | foam |
| 167 | foam attachments |
| 170 | buckle webbing (buckle fixation) |
| 1000 | computer program product |
| 1010 | computer readable medium |
| 1020 | computer readable code |

What is claimed is:

1. A navigation system for aiding a user navigating, comprising:
   a belt having a belt length and opposite belt ends, and comprising an elongated compartment, the belt including a nonelastic material for providing the belt with an invariable length in a longitudinal direction;
   a belt coupling arranged to the belt for coupling the belt ends;
   a compass sensor arranged to the belt, for sensing a compass direction based on the earth's magnetic field;
   a tactile unit arranged to the belt coupling for tactile communicating a direction to the user;
   tactile actuators, arranged inside the elongated compartment of the belt and distributed over the length of the belt, for communicating a direction to the user;
   an elongated mesh having a size configured for arranging the elongated mesh inside the elongated compartment, wherein the tactile actuators are arranged to the mesh; and
   a processing unit configured to:
      receive the compass direction from the compass sensor;
      retrieve a waypoint defining a point to where the user is navigating;
      retrieve a current position of the user;
      determine a bearing based on the waypoint and the current position;
      determine an alignment based on the bearing and the compass direction;
      associate one of the tactile actuators with a deviation from the alignment;
      activate one of the tactile actuators based on the deviation from the alignment; and
      activate the tactile unit based on the alignment,
   wherein:
      at least a part of the tactile unit is arranged to the mesh,
      the mesh is made of a non-stretchable material for providing the mesh in a longitudinal direction with an invariable length,
      the mesh comprises a mesh coupling arranged to an end of the mesh for coupling the mesh to the belt at a location close to the belt coupling,
      the navigation system further comprises an inside spacer material in use arranged between the tactile unit and the user and, between the tactile actuators and the user, and an outside spacer material in use arranged on an outside of the tactile unit relative to the user and, on an outside of the tactile actuators relative to the user,
      the belt coupling comprises a buckle and a buckle receiver arranged for cooperating with the buckle for forming a belt coupling and the tactile unit is arranged to the buckle receiver.

2. The navigation system of claim 1, wherein the processing unit is configured to activate the tactile unit or one of the tactile actuators when the bearing and the compass direction align within an alignment range.

3. The navigation system of claim 1, wherein the tactile unit is arranged under the belt coupling.

4. The navigation system of claim 1, wherein the tactile unit comprise a single tactile actuator.

5. The navigation system of claim 1, wherein the tactile actuators are evenly distributed over the length of the belt when also taking the tactile unit into account.

6. The navigation system of claim 1, wherein the tactile actuators are distributed to the ends of the belt.

7. The navigation system of claim 6, wherein at least a part of the tactile unit is arranged inside the elongated compartment.

8. The navigation system of claim 1, wherein:
   the belt comprises a compartment opening for accessing the elongated compartment, and a closing element for closing the elongated compartment, and
   the compartment opening is arranged to a long edge of the elongated compartment.

9. The navigation system of claim 1, wherein:
   the belt comprises a coarse adjustment element for coarse adjusting the length of the belt, a second elongated compartment,
   the coarse adjustment element is arranged such that the belt length is changed halfway between the opposing ends of the belt;
   the coarse adjustment element comprises a coupling arranged inside the elongated compartment,
   the elongated compartment is arranged between the first belt end and halfway the belt length and the second elongated compartment is arranged between the second belt end and halfway the belt length; or
   the belt comprises two lobes arranged on both sides of the middle of the belt and in use on the bottom side of the belt.

10. The navigation system of claim 1, wherein:
   the processing unit is also configured to retrieve a compass compensation,
   determining the alignment is also based on the compass compensation;
   the processing unit is also configured to: receive an indication that the tactile unit is facing a specified direction; calculate a difference between the specified direction and the current compass direction; and store the difference as the compass compensation;

the navigation system further comprises a first interface for inputting the specified direction;

the processing unit is also configured to receive the specified direction from the first interface;

the specified direction is North;

the navigation system further comprises a second interface for inputting locations;

the processing unit is also configured to receive a digital map, receive a first location from the second interface, receive a second location from the second interface, calculate the specified direction based on the first location and the second location; or the processing unit is also configured to: receive a first GNSS location from a GNSS sensor at a first moment in time; receive a second GNSS location from the GNSS sensor at a second moment in time, the user wearing the navigation system having travelled a distance in a straight line; receive at least one compass direction during the time interval between the first and the second moment in time; calculate a GNSS direction by subtracting the first GNSS location from the second GNSS location; calculate a difference between the GNSS direction and the at least one compass direction; and store the difference as the compass compensation.

11. The navigation system of claim 10, wherein the processing unit is also configured to:

receive a plurality of compass directions during the time interval between the first and the second moment in time; and calculate the compass direction based on the plurality of compass directions.

12. The navigation system of claim 10, further comprising a third interface for inputting a reference location, wherein the processing unit is also configured to:

receive the reference location;

receive an indication that the tactile unit is facing the reference location;

receive the GNSS location from a GNSS sensor;

calculate a GNSS direction by subtracting the GNSS location from the reference location;

calculate a difference between the GNSS direction and the compass direction; and store the difference as the compass compensation.

13. The navigation system of claim 1, wherein:

the processing unit is further configured to: determine a course based on a first position and a second position of the user; and determine a course alignment based on the course and the bearing; and activating the tactile unit or one of the tactile actuators comprises activating the tactile unit or one of the tactile actuators with an activation pattern based on the course alignment.

14. The navigation system according to claim 1, wherein the tactile unit comprises two tactile actuators arranged at opposite sides relative to the middle of the belt coupling.

15. A method for operating a navigation system that includes a belt having a belt length and opposite belt ends, and comprising an elongated compartment, the belt including a nonelastic material for providing the belt with an invariable length in a longitudinal direction; a belt coupling arranged to the belt for coupling the belt ends; a compass sensor arranged to the belt, for sensing a compass direction based on the earth's magnetic field; a tactile unit arranged to the belt coupling for tactile communicating a direction to the user; tactile actuators, arranged inside the elongated compartment of the belt and distributed over the length of the belt, for communicating a direction to the user; and an elongated mesh having a size configured for arranging the elongated mesh inside the elongated compartment, wherein the tactile actuators are arranged to the mesh, the method comprising:

receiving a compass direction from the compass sensor;

retrieving a waypoint defining the point where to the user is navigating;

retrieving a current position of the user;

determining a bearing direction based on the waypoint and the current position;

determining an alignment based on the bearing direction and the compass direction;

associating one of the tactile actuators with a deviation from the alignment;

activating one of the tactile actuators based on the deviation from the alignment; and activating the tactile unit based on the alignment, wherein:

at least a part of the tactile unit is arranged to the mesh, the mesh is made of a non-stretchable material for providing the mesh in a longitudinal direction with an invariable length, the mesh comprises a mesh coupling arranged to an end of the mesh for coupling the mesh to the belt at a location close to the belt coupling, the navigation system further comprises an inside spacer material in use arranged between the tactile unit and the user and, between the tactile actuators and the user, and an outside spacer material in use arranged on an outside of the tactile unit relative to the user and, on an outside of the tactile actuators relative to the user, the belt coupling comprises a buckle and a buckle receiver arranged for cooperating with the buckle for forming a belt coupling and the tactile unit is arranged to the buckle receiver.

16. The method of claim 14, further comprising:

retrieving a compass compensation, wherein determining the alignment is also based on the compass compensation.

17. A computer program product for operating a navigation system that includes a belt having a belt length and opposite belt ends, and comprising an elongated compartment, the belt including a nonelastic material for providing the belt with an invariable length in a longitudinal direction; a belt coupling arranged to the belt for coupling the belt ends; a compass sensor arranged to the belt, for sensing a compass direction based on the earth's magnetic field; a tactile unit arranged to the belt coupling for tactile communicating a direction to the user; tactile actuators, arranged inside the elongated compartment of the belt and distributed over the length of the belt, for communicating a direction to the user; and an elongated mesh having a size configured for arranging the elongated mesh inside the elongated compartment, wherein the tactile actuators are arranged to the mesh, the computer program product including a computer readable medium having computer readable code embodied therein, the computer readable code being configured such that, on execution by a suitable computer, the computer program product is caused to:

receive a compass direction from the compass sensor;

retrieve a waypoint defining the point where to the user is navigating;

retrieve a current position of the user;

determine a bearing direction based on the waypoint and the current position;

determine an alignment based on the bearing direction and the compass direction;

associate one of the tactile actuators with a deviation from the alignment;

activate one of the tactile actuators based on the deviation from the alignment; and activate the tactile unit based on the alignment, wherein:

at least a part of the tactile unit is arranged to the mesh, the mesh is made of a non-stretchable material for providing the mesh in a longitudinal direction with an invariable length, the mesh comprises a mesh coupling arranged to an end of the mesh for coupling the mesh to the belt at a location close to the belt coupling, the navigation system further comprises an inside spacer material in use arranged between the tactile unit and the user and, between the tactile actuators and the user, and an outside spacer material in use arranged on an outside of the tactile unit relative to the user and, on an outside of the tactile actuators relative to the user, the belt coupling comprises a buckle and a buckle receiver arranged for cooperating with the buckle for forming a belt coupling and the tactile unit is arranged to the buckle receiver, or the belt comprises a fine adjustment element for fine adjusting the length of the belt, the fine adjustment element being arranged between the buckle and the belt or the buckle receiver and the belt.

* * * * *